United States Patent [19]
Gabzdyl et al.

[11] Patent Number: 5,367,142
[45] Date of Patent: Nov. 22, 1994

[54] APPARATUS FOR THE THEMIC CUTTING OF MATERIALS

[75] Inventors: Jacek T. Gabzdyl, Guildford; Alcan V. Fernandes, London, both of England

[73] Assignee: BOC Group plc, Windlesham, England

[21] Appl. No.: 945,088

[22] Filed: Sep. 15, 1992

[30] Foreign Application Priority Data

Sep. 18, 1991 [GB] United Kingdom ............... 9119919

[51] Int. Cl.⁵ ............................................. D23K 26/14
[52] U.S. Cl. ......................... 219/121.67; 219/121.72; 219/121.84
[58] Field of Search ............... 219/121.67, 121.72, 219/121.84, 121.7, 121.71, 121.6, 121.82

[56] References Cited

U.S. PATENT DOCUMENTS

| 4,689,074 | 8/1987 | Seaman et al. | 219/121.65 |
| 4,894,511 | 1/1990 | Caledonia et al. | 219/121.84 |

FOREIGN PATENT DOCUMENTS

| 3927451 | 7/1990 | Germany . |
| 2194190 | 3/1988 | United Kingdom . |

OTHER PUBLICATIONS

Diaker, et al., Metallurgy Research Institute, "Gas Metal Trimming Process," Re: SU-A-812 461, Mar. 25, 1981.

Primary Examiner—C. L. Albritton
Attorney, Agent, or Firm—Larry R. Cassett

[57] ABSTRACT

In a continuous thermic cutting operation, assist gas is supplied to a thermic cutter in the form of pulses at a predetermined frequency. The pulse effect can be achieved by means of a solenoid valve, mechanical rotary valve, cam driven valve or a self propelled valve.

12 Claims, 2 Drawing Sheets

APPARATUS FOR THE THEMIC CUTTING OF MATERIALS

TECHNICAL FIELD

The present invention relates to the thermic cutting of materials.

BACKGROUND OF THE PRIOR ART

When cutting, for example, metal with a $CO_2$ laser, an assist gas jet is directed by a nozzle onto the metal being cut.

Throughout this specification the expression "assist gas" is intended to embrace a gas which, during a thermic cutting process, is actively involved in the cutting process in that its primary function is either to react with or to provide a shielding atmosphere to protect the material being cut from reaction; and to provide kinetic energy to the molten material being removed during cutting. For the avoidance of doubt the expression "assist gas" is not intended to cover gas that has a modulating effect on the power source of a thermic cutter. In the case of laser cutting, the assist gas is essential for blowing out the molten metal and debris as the laser beam passes over the metal. As aforesaid the assist gas may be inert and thereby protect the metal sheet from oxidation or contamination. Alternatively, the assist gas may be reactive and thus act exothermically with the metal being cut thereby releasing heat such that the cutting operation is enhanced in terms of faster cutting speeds.

Currently, most laser cut metal sheets show pronounced striations which are caused due to the periodic melting effect which occurs coupled with the uneven ejection of the molten metal and debris by the assist gas.

UK application, Publication No. 2194190, describes a method or and an apparatus for intermittently welding or cutting material using a supersonic plasma arc torch which is controlled by modulating the gas flow to the torch at a frequency equal to a desired rate of repetition of cutting or welding actions. A high gas flow rate results in a plasma jet of greater power density and diameter than a lower gas flow rate. In other words, the gas has a modulating effect on the power density of the prime heat source of the torch. This document does not relate to the continuous thermic cutting of material by the modulation of an assist gas.

SUMMARY OF THE INVENTION

It is an aim of the present invention to provide an apparatus and method for the continuous thermic cutting of materials which provides a better cut quality as measured, for example, by the surface roughness of the cut; the dross adherence on the underside of the kerf; and in the absence of excessive burning on the lower kerf which if present would result in an uneven cut edge. According to one aspect of the present invention, an apparatus for the continuous thermal cutting of material comprises a thermic cutter and a gas delivery system including a source of assist gas under pressure, conduit means for the passage of said gas from the source to the thermic cutter and control means located in the conduit means between the gas source and the thermic cutter, said control means being capable, when operated, of supplying said assist gas to the thermic cutter in the form of pulses at predetermined frequencies.

According to a further aspect of the present invention, a method of continuously thermally cutting material in which a thermic cutter is supplied with an assist gas comprises controlling the supply of the assist gas to the thermic cutter such that the assist gas is pulsed at a predetermined frequency.

The pulses represent a modulation of the flow and the pressure of the assist gas output through a nozzle forming part of the gas delivery system.

BRIEF DESCRIPTION OF THE DRAWINGS

An embodiment of the invention will now be described, by way of example, reference being made to the Figures of the accompanying diagrammatic drawings in which.

DETAILED DESCRIPTION OF THE INVENTION

Figure 1:
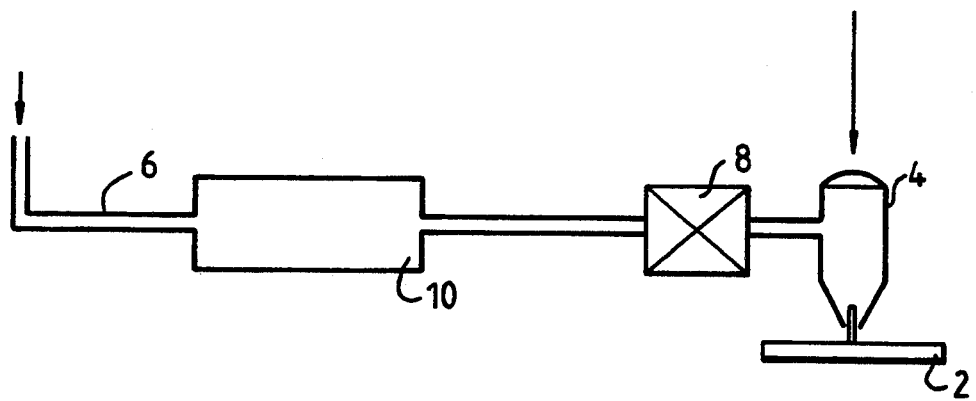
FIG. 1 is a diagrammatic representation of a $CO_2$ laser and an assist gas delivery system according to the present invention.

As shown, a thermic cutter in the form of a $CO_2$ laser when operated directs a beam of energy onto a workpiece in the form of a mild steel plate 2 having a thickness of, for example, 5 to 10 mm. Surrounding the laser beam and coaxial therewith is a nozzle 4 forming part of an assist gas delivery system. The nozzle 4 is connected by conduit means 6 to a source of assist gas, for example, oxygen under pressure in a cylinder (not shown) controlled by a gas regulator (not shown). Located within the conduit means 6 between the oxygen cylinder and the nozzle 4 is a control means 8 in the form, for example, of a solenoid valve. The solenoid valve is controlled by a frequency modulator circuit which produces a gated output voltage, the frequency and mark-to-space ratio of which can be controlled by potentiometers fitted on the circuit, hence giving an effective control on the opening and shutting of the control means.

An expansion chamber 10 is located in the conduit means 6 between the oxygen cylinder and the control means 8 which mitigates against any back pressure which may be set up affecting the oxygen cylinder regulator.

Figure 2:
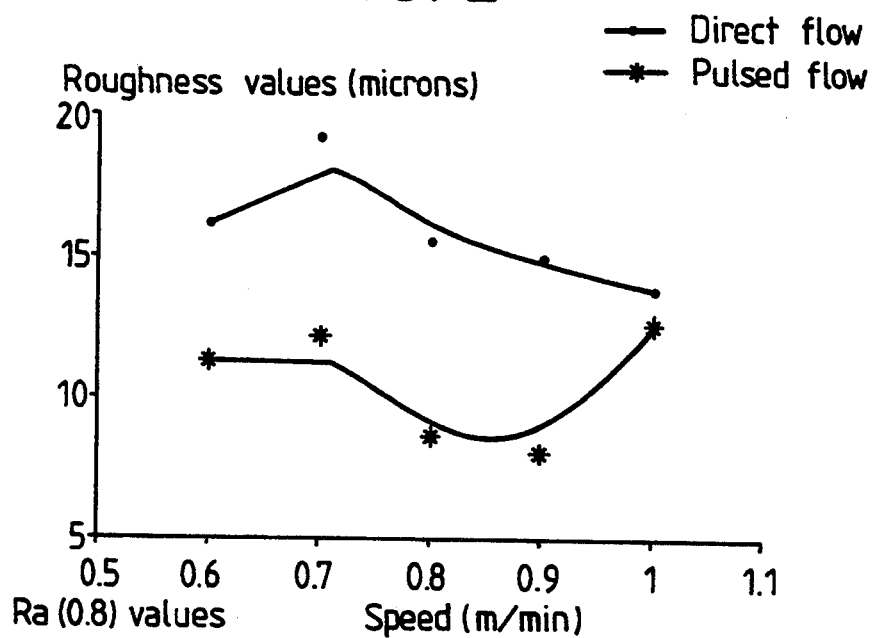
FIGS. 2 is a graph comparing roughness values when cutting material using a constant pressure or non-pulsed assist gas flow and a modulated or pulsed assist gas flow.

In use, the oxygen assist gas under pressure passes from the oxygen cylinder and regulator through conduit means 6 and expansion chamber 10 towards the control means 8. The oxygen flow to the nozzle 4 is effectively pulsed at a predetermined frequency, for example, from 30 to 500 Hz. The pulsed gas exits the nozzle 4 as a jet for blowing out molten metal and debris. Referring now to FIG. 2 which is a graph illustrating the roughness values obtained when using a modulated or pulsed assist gas flow during a cutting operation at varying cutting speeds when compared with a constant pressure or non-pulsed assist gas flow. It is apparent that the roughness obtained during the pulsed assist gas flow was less than that using the constant pressure assist gas flow.

Figure 3:
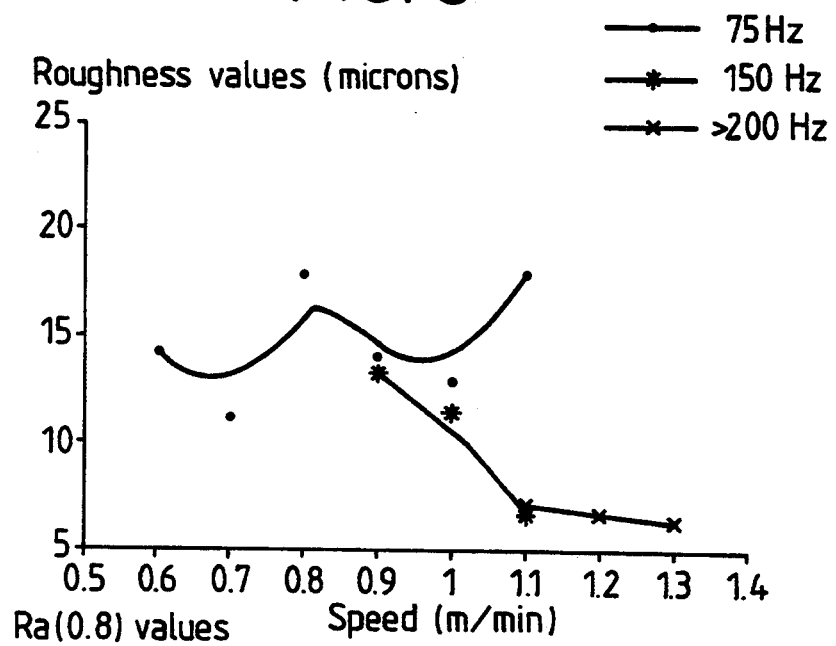
FIG. 3 is a graph comparing roughness values when cutting material with a modulated or pulsed assist gas flow at different pulse frequencies.

FIG. 3 indicates that raising the frequency of modulation of the assist gas flow tends to reduce the roughness of cut obtained.

Although reference has been made in the above described embodiment to $CO_2$ laser cutting of metal, the concept of supplying pulsed assist gas to other types of thermic cutting is clearly contemplated.

Furthermore, although reference has been made to a solenoid valve as the control means 8, other alternatives may be used. For example, a mechanical rotary valve; a cam driven valve; a self propelled valve, that is, a rotary valve where gas pressure actuates rotation; or a valve including a driven piston or diaphragm which imparts pressure pulses to a constant flow of assist gas.

To obtain optimum benefits from the pulsed assist gas delivery system described, initial experimental work needs to be carried out concerning the volumes of the expansion chamber 10 and the nozzle chamber as well as the internal shapes of these vessels together with the distance that the nozzle is located from the workpiece and the material of the workpiece being cut.

It has been found when using the pulse gas delivery system with $CO_2$ laser cutting of mild steel, the cut quality in terms of measurement of the surface roughness of the cut (FIG. 2), in terms of the dross adherence on the underside of the kerf, and the reduction of outward burning on the lower kerf, are improved when compared with constant pressure assist gas delivery systems. It has also been found that the pulse frequency is an important factor in achieving optimum cutting results in terms of cut roughness (FIG. 3).

Furthermore, there is a decrease in the overall gas volume required achieve acceptable cut quality over constant gas pressure cutting.

The pulsed assist gas can be supplied to the thermic cutting process via a single nozzle as described or by a concentric or annular nozzle; by an array of relatively small nozzles; or by an off-axis nozzle arrangement.

It is also contemplated to use pulsed assist gas to enhance piercing or cut initiation of a workpiece.

Although the invention has been described with reference to specific example, it will be appreciated by those skilled in the art that the invention may be embodied in any other form.

I claim:

1. An apparatus for the continuous thermal cutting of material comprising a thermic cutter and a gas delivery system including source of assist gas under pressure, conduit means for the passage of said gas from the source to the thermic cutter and control means located in the conduit means between the gas source and the thermic cutter and capable, when operated, of supplying said assist gas to the thermic cutter in the form of pulses at predetermined frequencies.

2. An apparatus as claimed in claim 1, in which the thermic cutter is a $CO_2$ laser and the pulse frequency is between 30 to 500 Hz.

3. An apparatus as claimed in claim 1, in which the control means is an oscillating solenoid valve.

4. An apparatus as claimed in claim 1, in which the control means is a mechanical rotary valve.

5. An apparatus as claimed in claim 1, in which the control means is a cam driven valve.

6. An apparatus as claimed in claim 1, in which the control means is a self propelled valve.

7. An apparatus as claimed in claim 1, in which the control means is a valve which includes a driven piston or diaphragm which imparts pressure pulses to a constant flow of assist gas.

8. An apparatus as claimed in of claim 1, in which an expansion chamber is located in the conduit means between the gas source and the control means.

9. An apparatus as claimed in claim 8, in which the gas delivery system includes at least one nozzle, the shape and dimensions of the nozzle and the expansion chamber being selected in conjunction with the pulse frequency to achieve a strong resonance effect.

10. A method of continuously thermally cutting material in which a thermic cutter is supplied with an assist gas delivered in the form of pulses of gas at a predetermined frequency.

11. A method as claimed in claim 10, in which the frequency is between 30 to 500 Hz.

12. A method of initially piercing material in which a thermic cutter is supplied with an assist gas delivered in the form of pulses of gas at a predetermined frequency.

* * * * *